United States Patent
Cockroft et al.

(10) Patent No.: US 7,467,291 B1
(45) Date of Patent: Dec. 16, 2008

(54) SYSTEM AND METHOD FOR CALIBRATING HEADROOM MARGIN

(75) Inventors: Adrian N. Cockroft, Los Gatos, CA (US); Elizabeth Purcell, Los Gatos, CA (US); Enrique Vargas, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 710 days.

(21) Appl. No.: 11/068,148

(22) Filed: Feb. 28, 2005

(51) Int. Cl.
*G06F 9/00* (2006.01)
(52) U.S. Cl. .......................................... 713/1; 713/100
(58) Field of Classification Search ..................... 713/1, 713/2, 100; 718/104, 105
See application file for complete search history.

(56) References Cited

U.S. PATENT DOCUMENTS

| | | | |
|---|---|---|---|
| 7,107,187 B1 * | 9/2006 | Saghier et al. .............. | 702/186 |
| 7,236,915 B2 * | 6/2007 | Algieri et al. ................. | 703/13 |
| 2003/0115244 A1 * | 6/2003 | Molloy et al. ................ | 709/105 |
| 2005/0021530 A1 * | 1/2005 | Garg et al. ................... | 707/100 |
| 2005/0131982 A1 * | 6/2005 | Yamasaki et al. ........... | 709/200 |

* cited by examiner

*Primary Examiner*—Mark Connolly
*Assistant Examiner*—Paul B Yanchus, III
(74) *Attorney, Agent, or Firm*—Park, Vaughan & Fleming LLP

(57) ABSTRACT

A system and method for dynamically calculating margin for a set of computer resources (e.g., processors, disk storage, memory, communications). The headroom of a set of resources is equal to the total capacity of the resources minus a margin. Margin is a portion of the total capacity not to be used, so as to allow for acceptable response times. An initial margin may be selected using a graph plotting total resource utilization level percentage against response time. For a desired or acceptable response time factor, the initial margin is selected as 100% minus the utilization percentage that yields the selected response time factor. Then, as the workload is run, data are collected showing response times for different load levels. A modified curve is generated (e.g., using standard regression) and a new margin selected from that curve.

20 Claims, 5 Drawing Sheets

SYSTEM AND METHOD FOR CALIBRATING HEADROOM MARGIN

BACKGROUND

This invention relates to the field of computer systems. More particularly, a system and methods are provided for calculating headroom margin.

Computer systems become less responsive as utilization of their resources (e.g., processors, disk drives, memory, communications) approaches 100%. At a given level or percentage of utilization, the remaining capacity of a particular device or set of devices comprises usable headroom plus margin. Headroom comprises capacity that may still be allocated. Margin comprises capacity that should not be used, so as to maintain adequate response time.

The minimum size of the margin depends on many factors, such as utilization, workload characteristics, the number of devices servicing the workload, how acceptable a decrease in performance or response time is, etc. However, no adequate methods of calculating an effective or desirable margin presently exist that can consider the various pertinent factors. As a result, capacity planning becomes very difficult, particularly for environment in which workloads vary.

SUMMARY

In one embodiment of the invention, a system and methods are provided for dynamically calculating margin for a set of computer resources (e.g., processors, disk storage, memory, communications). The headroom of a set of resources is equal to the total capacity of the resources minus a margin. Margin is a portion of the total capacity not to be used (e.g., to be reserved), so as to allow for acceptable response times. An initial margin may be selected using a graph plotting total resource utilization level percentage against response time for an assumed random workload. For a desired or acceptable response time factor, the initial margin is selected as 100% minus the utilization percentage that yields the selected response time factor. Then, as the workload is run, data are collected showing response times for different load levels. A modified curve is generated (e.g., using standard regression) and a new margin selected from that curve.

A shape parameter (or randomness coefficient) describing the modified curve may be stored. When a workload matching the workload that yielded the modified curve is again encountered, the shape parameter may be used to regenerate the curve and aid selection of a suitable margin.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, a system and method are provided for calculating headroom margin for a set of devices (e.g., processors, disk drives, memory, communication interfaces) in a computer system. Illustratively, the margin may be initially calculated using a formula that depends on the number of devices and the way the workload is balanced among those devices. Utilization level and response time can then be measured for the system as a whole or for each individual workload, and a calibration curve may be produced from those measurements to modify the initial curve. A response time threshold on this curve can then be used to determine the actual margin to use for the workload.

Figure 1:
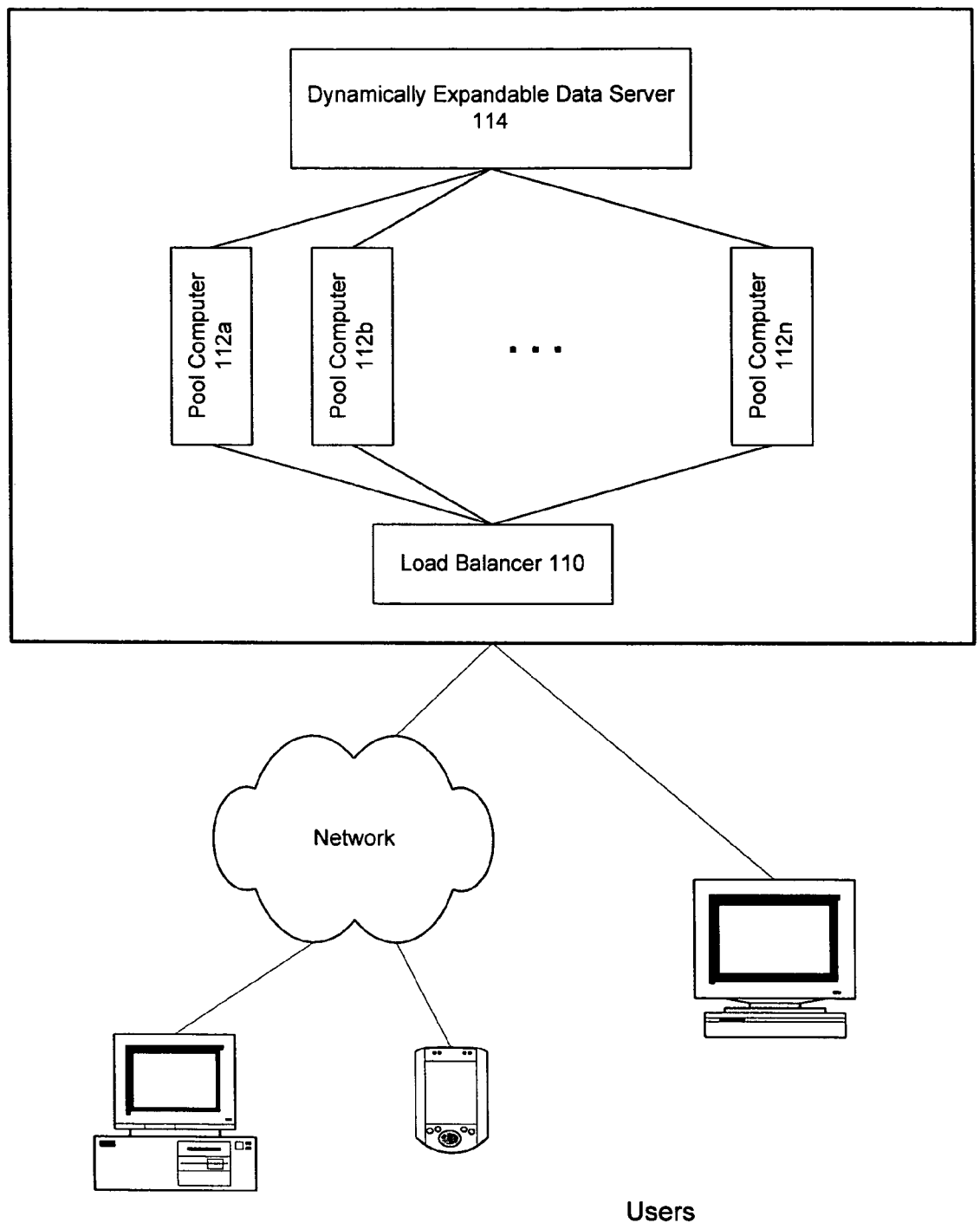
FIG. 1 is a block diagram depicting a computing environment in which an embodiment of the present invention may be implemented.

FIG. 1 is a block diagram of a computing environment in which an embodiment of the invention may be implemented. Computing center 104 may be a datacenter or other location that hosts a dynamically reconfigurable set of computing resources. Users access computing center 104 via any types of communication links, which may include direct connections and network (e.g., Internet) connections.

Illustrative resources within computing center 104 include load balancer 110, which is configured to balance demand for a resource among different instances. For example, computers 112a-112n may comprise a pool of small computer systems (e.g., servers, blades) capable of receiving user work requests and either satisfying such requests directly or by drawing upon other resources, such as data server 114. Each pool computer may have local storage or other resources, or a set of storage devices may be coupled to the entire pool of computers. The number of computers 112 in the pool may be dynamically adjusted, depending on the workload (e.g., number or rate of user work requests).

Data server 114 includes or is coupled to data storage devices, and may dynamically expand or contract as more or less storage is required. For example, if data server 114 hosts a database, additional disk drives may be allocated to the server as the database increases in size. Data server 114 may be an SMP (Symmetric Multiprocessor) node, and may be directly coupled to load balancer 110.

Computing center 104 may also include a controller, monitor or other entity configured to dynamically allocate or reallocate resources to meet shifting or evolving demand. For example, as demand for a database hosted by data server 114 increases, additional processors may be brought online within the server. Or, as demand for web services hosted by pool computers 112 increases, additional computers may be added to the pool.

Figure 5:
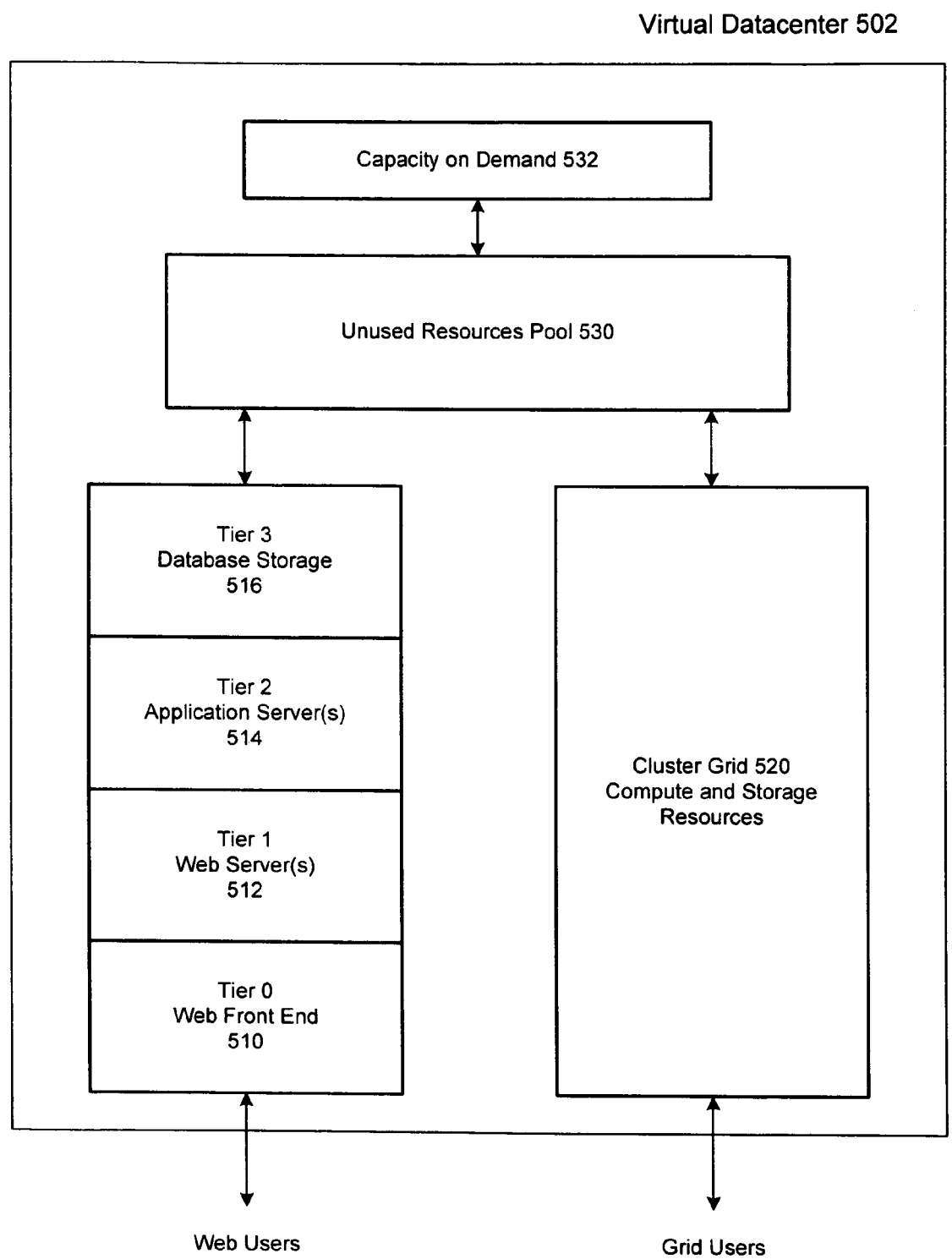
FIG. 5 is a block diagram of a virtual datacenter in which an embodiment of the present invention may be implemented.

FIG. 5 depicts another computing environment in which an embodiment of the invention may be implemented. Virtual datacenter 502 of FIG. 5 provides computing resources and services for various types of users and requests. Thus, one pool of resources (e.g., computers, processors, storage) may be allocated to tiers 0-3, comprising web front end 510, web servers 512, application servers 514 and database storage 516. Front end 510 may include a load balancer.

Each tier may encompass any number of separate resources of different types, and the overall collection is well suited to receiving and handling random or bursty workloads. However, sufficient resources must be allocated to handle such workloads, including a sufficient margin to help ensure adequate responsiveness.

For high performance computing (e.g., modeling, simulations), cluster grid 520 comprises a separate set of resources. Grid 520 may include a front end, such as Grid Engine Enterprise Edition by Sun Microsystems, Inc. Because workloads of the grid may be relatively stable or constant, the level of resources allocated to the grid may more closely match the workload (i.e., less margin).

Unused resources pool 530 comprises resources not currently allocated to cluster grid 520 or tiers 0-3. These resources are allocated as needed to meet shifting load levels. Additionally, capacity on demand 532 may include additional resources purchased or leased as needed to meet demand beyond what is available in pool 530.

An embodiment of the invention enables more accurate capacity planning for a data center or other environment in which computing resources may be dynamically re-allocated, by determining an efficient margin of unused resource capacity for a given workload. The calculated margin is dynamic, so that it can change as the workload changes.

In this embodiment, utilization of a resource (e.g., processors, disk storage, memory, communications, air conditioning) is defined as the proportion of time that the resource is busy. For example, a processor's utilization may be measured as the processor's busy time divided by total elapsed time. Advantageously, the Solaris® operating system by Sun Microsystems, Inc. provides a microstate accounting feature that reports resource utilization on a per-process or per-thread basis.

Headroom is defined as the available amount of a resource and equals the total measure (e.g., number of instances) or total capacity of the resource minus the margin and the peak utilization. The more dynamic the workload of the resource is, the more difficult it is to calculate an effective margin and determine the headroom.

Because total capacity of a resource in an environment such as computing center 104 of FIG. 1 is dynamic, a resource's load may be measured in terms of the equivalent number of instances of the resource that are fully utilized. Thus, if the workload of a four processor SMP node keeps the processors 75% busy, the load may be measured as "3.0". If all the instances of a resource are not equivalent or identical, different units may be used (e.g., MIPS (millions of instructions per second) or M-values for processors).

A goal of an environment such as computing center 104 of FIG. 1 or datacenter 502 of FIG. 5 may be to maintain utilization of a resource within a range that safely minimizes headroom, thereby providing stable performance at minimum cost. This requires the calculation of an effective, efficient margin.

Figure 2:
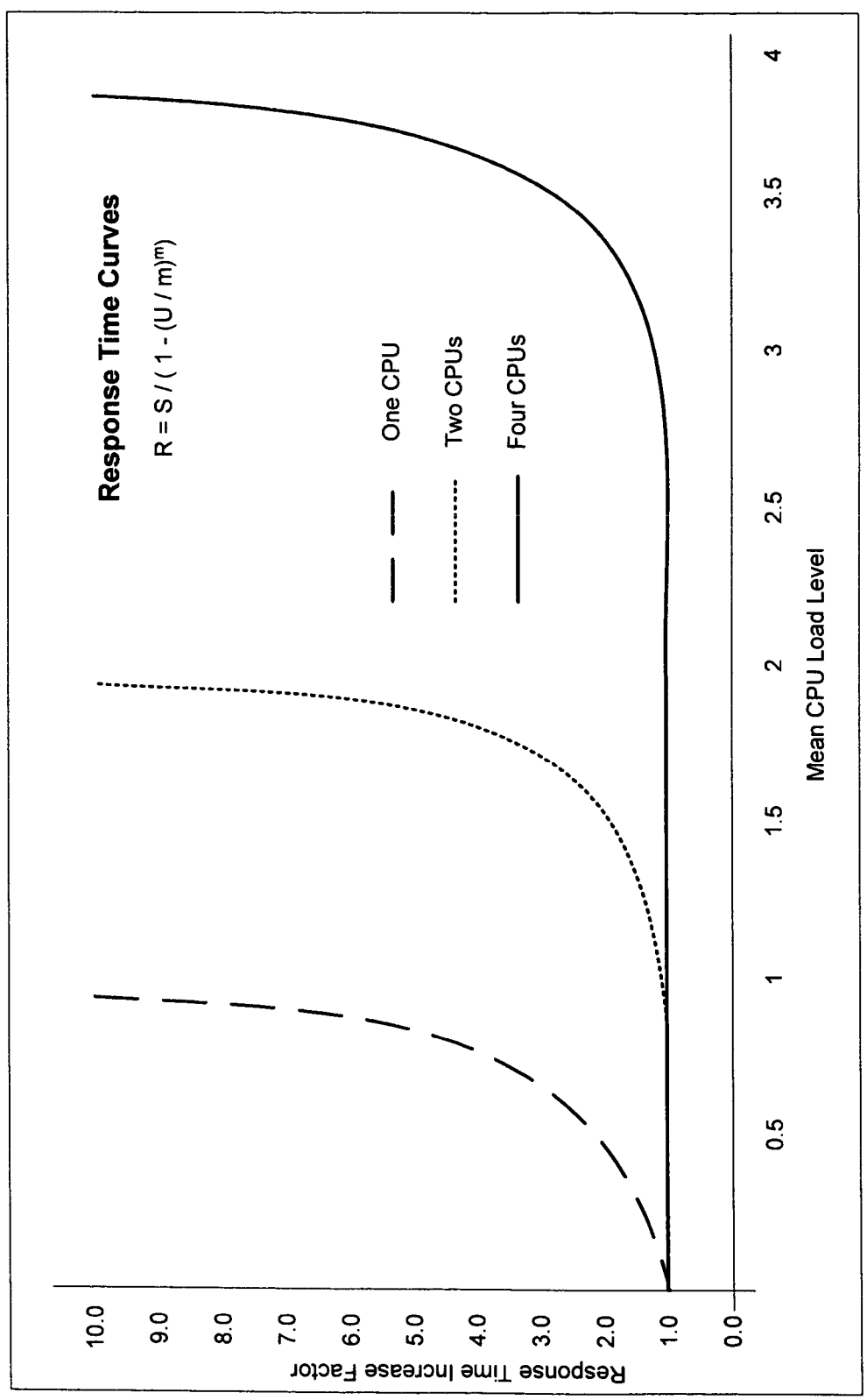
FIG. 2 is a set of response time curves showing response time increase factors for different mean resource load levels.

FIG. 2 is a graph of response time curves for random arrival of work from a large user population, with response time increase factors plotted on the y-axis and mean processor load levels plotted on the x-axis. In this graph, mean processor load level is a measure of utilization and, as described above, indicates the number of processors that would be fully utilized by the current load. The equation for computing response time increase factor R is:

$$R=S/(1-(U/m)^m)$$

where S is service time, U is utilization and m is the number of instances of the resource. The service time of a request is the time during which the requested resource is actually used.

Three curves are depicted in FIG. 2. The left-hand curve shows how response time increase factors vary for a single processor system. The middle curve shows response time increase factors for a two processor system. The right-hand curve shows response time increase factors for a four processor system. The curves maintain similar shapes, stretched over different mean processor load levels.

FIG. 2 shows that on a single processor system, the response time increase factor hits 3.0 when the mean load level is approximately 0.7, while a two processor system hits the same response time increase factor at a mean load level of approximately 1.7 and a four processor system does not hit a 3.0 response time increase factor until the mean load level is approximately 3.7.

Figure 3:
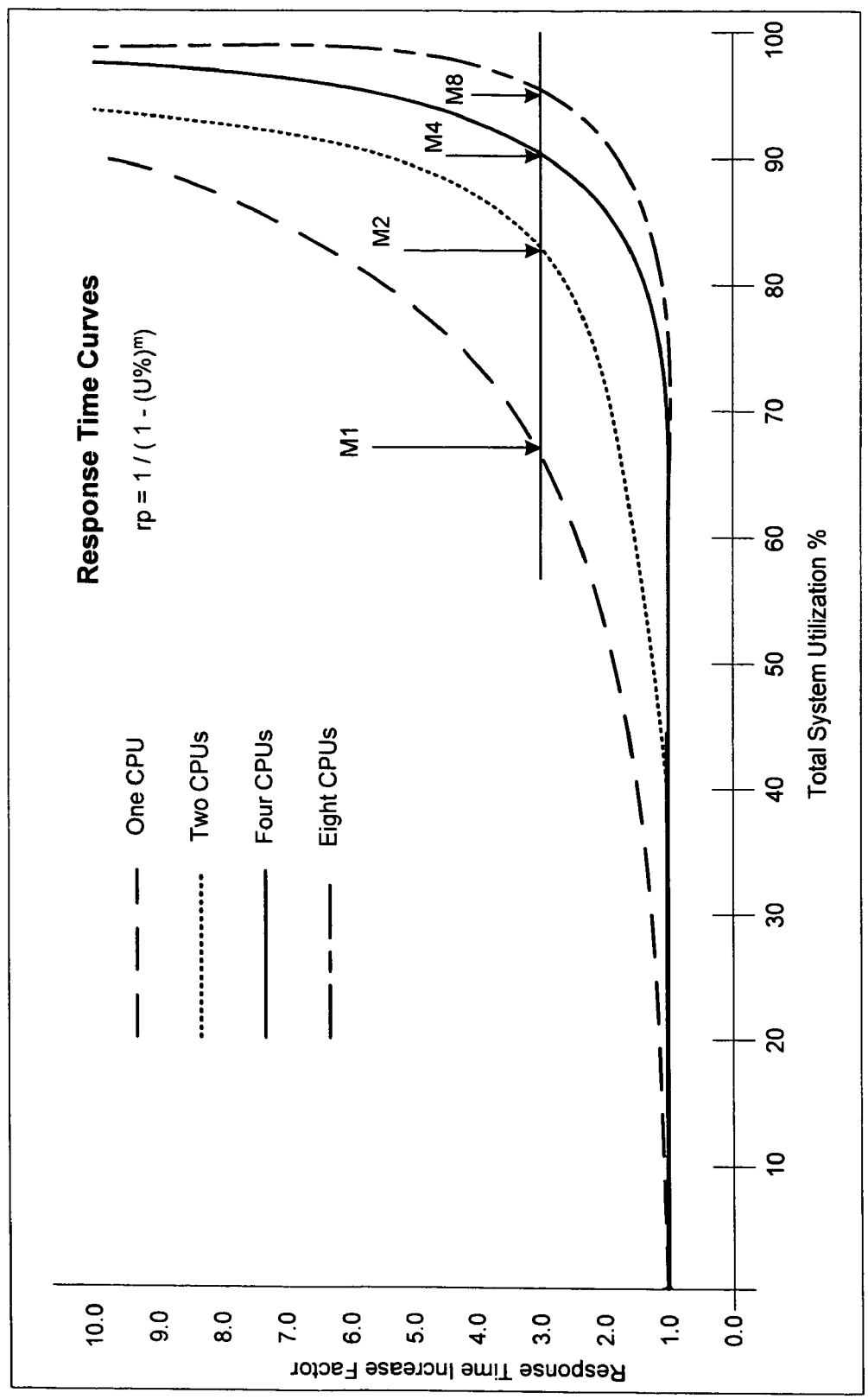
FIG. 3 is a set of response time curves showing response time increase factors for different total resource utilization percentages.

FIG. 3 is a graph of response time curves showing response time increase factors plotted for different total system utilization percentages. An equation for response time increase factor R is $$R=S/(1-(U\%)^m)$$

To remove service time as a factor we may define a ratio "rp" as R/S, which is robust even when service time varies. rp is thus equal to $$rp=1/(1-(U\%)^m)$$

Different rp curves are shown for systems having different numbers of processors. Illustrative initial margins M1, M2, M3 and M4 are shown, based on a target response time increase factor of 3.0. If a lower response time increase factor is necessary, or if a higher one is acceptable, the initial margin can be adjusted accordingly.

For example, the curve second from the left is for a two processor system. Assuming that a response time increase factor of no more than 3.0 is acceptable, then a suggested initial margin (M2) is approximately 18% (100%-82%). The suggested initial margin for a four processor system (M4) decreases to 10% (100%-90%). Systems with more processors can thus run at higher utilization levels, and have smaller margins, but will degrade more rapidly when their headroom is finally exhausted.

For a resource (e.g., processor) for which an effective margin of unused capacity is desired, an initial margin may be calculated or adopted from a graph of response times for a workload, as shown in FIG. 3. In one embodiment of the invention, calculation of an initial margin starts with the use of a theoretical curve of response times for a current number of processors. The number of processors may be abbreviated as "proc". A lower limit on the distribution of load values, which may be represented as "ll", is set as the minimum acceptable utilization level that is consistent with a low total cost of ownership (TOC):

$$ll=proc*0.3$$

A target or maximum desirable response time increase factor "rtifgoal" is then selected, such as 3.0, representing a two hundred percent increase in response time as compared to the response time when the load level is at the lower limit (ll) (i.e., 3.0 is two hundred percent more than 1.0).

The equation for RP above is then inverted algebraically to produce $$U=m*\exp(\log((rp-1.0)/rp)/m)$$

To determine the rp limit, we need to identify an upper limit "ul" on utilization, which can be defined as ul=proc*exp(log((rtifgoal−1.0)/rtifgoal)/proc)

Then the peak load can be calculated, illustratively based on the mean load level plus two standard deviations "sd", and headroom percentage can be calculated as a proportion of the upper utilization limit:

headp=100.0*(1.0−(mean+2.0*sd)/ul)

From the calculated headroom percentage, the initial margin is then calculated as 100%−headp. The number of standard deviations to be added to the mean load level can be varied (e.g., based on the cost of failure to maintain adequate headroom)

In accordance with the Six-sigma methodology, a sigma level is the probability of failure, specified as a number of standard deviations from the mean. Given a lower limit (specified as "ll" above), the probability of utilization failing to meet a TCO goal is sigma_tco, and can be calculated as the number of standard deviations by which the mean exceeds the lower limit, plus the standard Six-sigma adjustment factor of 1.5.

Given an upper limit (specified as "ul" above), an unacceptable increase in response time would occur if utilization exceeded the upper limit. This could cause a service level agreement (SLA) failure. Therefore, sigma_sla may be calculated as the number of standard deviations by which the mean is below the upper limit, plus the standard Six-sigma adjustment factor of 1.5. The headroom calculation of two standard deviations is equivalent to maintaining a 3.5 sigma goal.

After the initial margin is calculated and applied, load levels and corresponding response times for an actual workload may be measured, and may be plotted. When a sufficient number of points has been measured, or a sufficient period of time has been observed, the points may be used to derive a modified curve. From the modified curve, a new margin may be calculated.

By effectively monitoring load levels and response times, and updating the margin appropriately, additional resources can be dynamically provisioned before headroom is exhausted. For example, in an SMP node, processor wait time may be used to measure the amount of time a process on the run queue spends waiting for a free processor. By continually monitoring the response time of the node, it can be detected when the headroom is in danger of being consumed, and an additional processor can be brought online.

Figure 4:
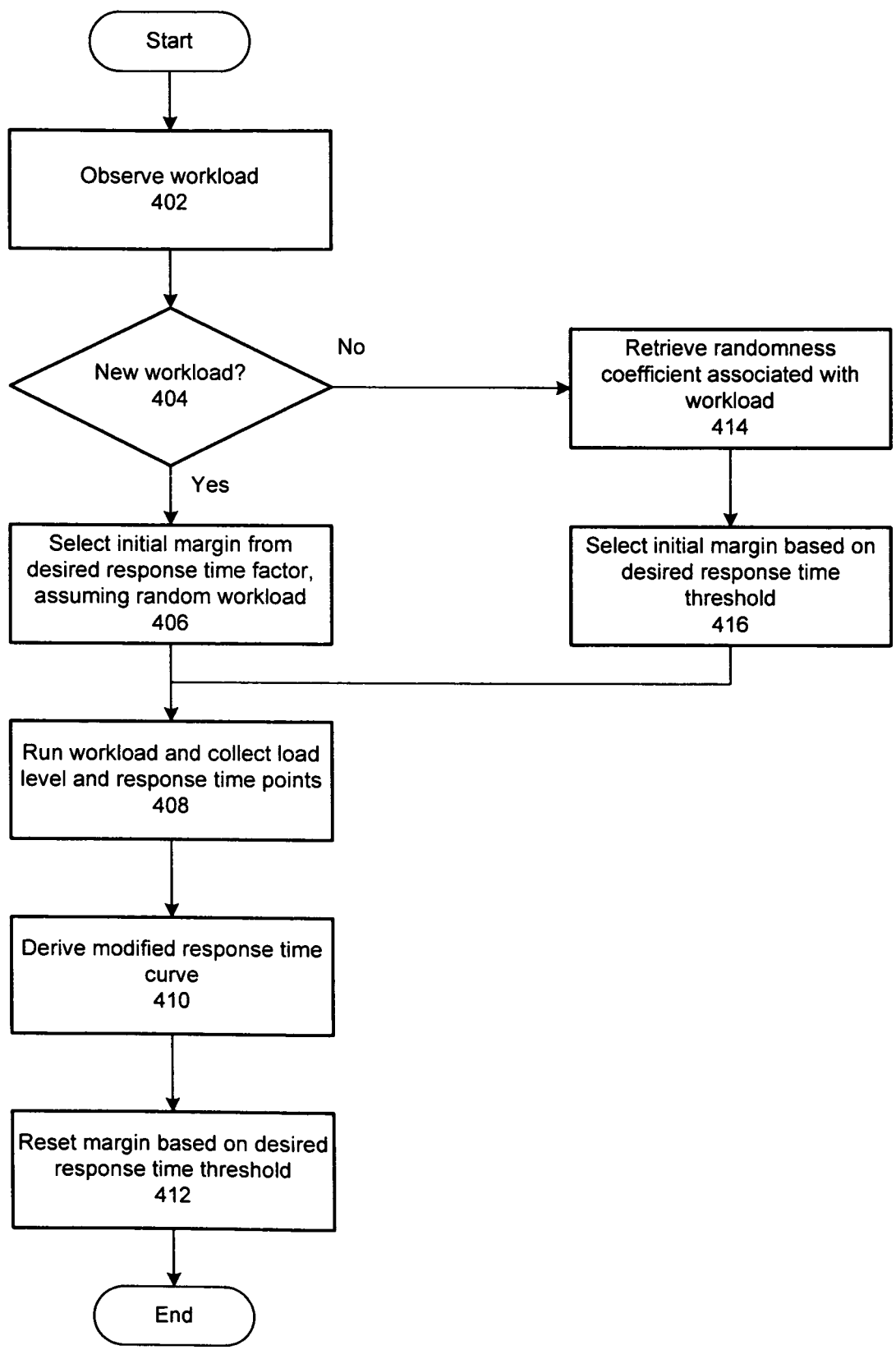
FIG. 4 is a flowchart illustrating one method of calibrating headroom margin, in accordance with an embodiment of the invention.

FIG. 4 depicts an illustrative method of dynamically calibrating a desirable margin for a set of computing resources, according to one embodiment of the invention. In this embodiment, the computing resources are processors; other embodiments of the invention may be derived from the following discussion for other types of resources (e.g., storage, memory, communications).

In operation 402, the current or expected workload is examined. The examination may determine the load level (e.g., constant units of work done per second), utilization level percentage (e.g., percentage of all allocated processors, that are in use), wait time, one or more standard deviations of the load level, etc.

In operation 404, it is determined whether the observed workload is new, or whether it matches (or is similar to) a workload previously experienced. If the workload has not been experienced before, the method continues with operation 406; otherwise, the process advances to operation 414.

In operation 406, an initial margin is selected or calculated. In this embodiment of the invention, for a new workload a random arrival of work requests may be initially assumed. Based on a graph of response times for random workloads (e.g., FIG. 3), and a desired or acceptable response time increase factor, the initial margin is determined. For example, as shown in FIG. 3, for a single processor system and allowing for a 3.0 response time increase factor, an initial margin is 32% (100%−68%) of capacity. For a four processor system, the initial margin may be 10%.

In operation 408, the workload is run and data are collected for plotting response times and load levels. The data will be used to define a new curve for selecting a new margin. Illustratively, every selected time period (e.g., thirty seconds, five minutes, sixty minutes) the current load level and response time are captured. As described above, a load level may be noted as the total number of processors whose full capacity would be needed to handle the current load, and may be expressed with any degree of certainty (e.g., one decimal place). For example, the load level may be expressed as the mean plus two standard deviations. The response time may be the instantaneous response time increase factor for a specific work request.

In different embodiments of the invention, load level and response time data may be collected over a selected time interval (e.g., one hour, one day) or until a desired number of data points are captured. For example, the full range of loads may be divided into a number of ranges (e.g., ten ranges). Load level and response time data may be collected continuously, but with only the last N data points in each range being maintained. Thus, at any time that a new curve is to be generated, data are available across the full spectrum of load levels, thereby allowing for a more accurate curve.

In operation 410, a modified response time curve is generated or plotted. In one implementation, a standard regression algorithm may be applied to fit to the data points. In this implementation, regression analysis is used to fit a curve to the captured data points, so that the margin can be calibrated from the new curve.

A shape parameter (e.g., randomness coefficient) describing the modified curve may be stored, so that the next time the same (or similar) workload is encountered, the response time curve can be easily regenerated. For example, the variation of response time with the number of processors may form a family of curves, where the processor count is the shape parameter—as shown in FIG. 3.

In operation 412, from the modified curve and the desired or acceptable response time increase factor (e.g., 200% or 3.0), a new margin is selected. For example, if the response time is worse than expected for the observed load levels, a larger margin may be implemented, thereby decreasing headroom. After operation 412, the illustrated method ends.

When headroom is calculated (e.g., total capacity minus margin), for an initial curve or modified curve, it may then be used to determine when to allocate or reallocate processor resources. For example, when the calculated headroom is exhausted or within some threshold proximity to being exhausted, another processor may be automatically allocated (e.g., in an SMP node) or another single processor computer may be added to a pool of single processor computers (e.g., computers 112 in FIG. 1).

In operation 414, because shape parameters or randomness coefficients are stored for various workloads, the coefficient previously used for the observed workload (or a workload similar to the observed workload) is retrieved. It may be used to plot or describe a response time curve that reflects the workload.

In operation 416, the initial margin is selected based on the response time curve described by the retrieved randomness coefficient. After operation 416, the method advances to operation 408.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory. On the other hand, computer-readable transmissions can include carrier waves on a transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. An automated method of determining a margin of capacity of a set of computing resources to be held in reserve, the method comprising:
    selecting a response time factor representing an acceptable level of response time for a workload, wherein the workload comprises a plurality of requests for a set of computing resources, and wherein said response time factor reflects a magnitude of response time increase as utilization of the set of resources increases;
    from a first set of data indicating response times for different percentages of utilization of the set of resources, identifying a first utilization percentage corresponding to said selected response time factor; and
    selecting an initial margin based on said first identified utilization percentage.

2. The method of claim 1, further comprising:
    from said initial margin and a current level of utilization of the set of resources, computing a headroom of usable capacity of the set of resources; and
    if said headroom approaches zero, allocating an additional member to the set of resources.

3. The method of claim 1, further comprising:
    collecting response time values for multiple workload levels;
    from said collected response time values, deriving a second set of data indicating response times for different percentages of utilization of the set of resources;
    from said second set of data, identifying a second utilization percentage corresponding to said selected response time factor; and
    selecting a modified margin based on said second identified utilization percentage.

4. The method of claim 3, further comprising:
    from said modified margin and a current level of utilization of the set of resources, computing a headroom of usable capacity of the set of resources; and
    if said headroom approaches zero, allocating an additional member to the set of resources.

5. The method of claim 4, wherein said current utilization level is measured as a count of members of the set of resources that would be fully utilized by the current workload.

6. The method of claim 3, wherein:
    said first set of data corresponds to a first graph of response time data for different percentages of utilization of the set of resources; and
    said second set of data corresponds to a second graph of response time data for different percentages of utilization of the set of resources.

7. The method of claim 6, further comprising:
    storing a shape parameter describing said second graph; and
    using said shape parameter to recreate said second set of data when the workload is later encountered.

8. The method of claim 1, wherein said first set of data comprises a curve plotting response time factors for the different percentages of utilization of the set of resources.

9. The method of claim 1, wherein said first set of data reflects random arrival of the requests for the set of resources.

10. The method of claim 1, wherein said selecting an initial margin comprises subtracting said first identified utilization percentage from one hundred percent.

11. A computer readable medium storing instructions that, when executed by a computer, cause the computer to perform a method of determining a margin of capacity of a set of computing resources to be held in reserve, the method comprising:
    selecting a response time factor representing an acceptable level of response time for a workload, wherein the workload comprises a plurality of requests for a set of computing resources and wherein said response time factor reflects a magnitude of response time increase as utilization of the set of resources increases;
    from a first set of data indicating response times for different percentages of utilization of the set of resources, identifying a first utilization percentage corresponding to said selected response time factor; and
    selecting an initial margin based on said first identified utilization percentage.

12. A computer-implemented method of dynamically adjusting a margin of reserved capacity of a set of computing resources, the method comprising:
    operating a set of resources having a dynamically adjustable membership;
    selecting a response time increase factor representing a target maximum response time increase to be tolerated as the workload of the set of resources increases;
    from graph data plotting response time increase factors against percentages of utilization of the set of resources, identifying a first utilization percentage corresponding to said selected response time increase factor;
    setting the margin of capacity of the set of resources to be held in reserve to one hundred percent minus said first utilization percentage;
    collecting response time data for a first workload comprising varying levels of loads on the set of resources;

from said collected response time data, assembling adjusted graph data plotting response time increase factors against percentages of utilization of the set of resources;

from said adjusted graph data, identifying a second utilization percentage corresponding to said selected response time increase factor; and adjusting said margin based on said second utilization percentage.

13. The method of claim 12, further comprising:
for a current load level, calculating a current headroom reflecting usable capacity of the set of resources; and
if said current headroom approaches zero, allocating an additional member to the set of resources.

14. The method of claim 12, wherein said graph data reflect a random arrival of requests for the set of resources.

15. The method of claim 12, further comprising:
storing a shape parameter describing said adjusted graph data for use in recreating said adjusted graph data when the first workload is subsequently encountered.

16. The method of claim 12, further comprising prior to said assembling adjusted graph data:
determining whether the first workload matches a previous workload for which a shape parameter was stored;
wherein said shape parameter is usable to recreate a set of graph data plotting response time increase factors against percentages of utilization of the set of resources for the previous workload.

17. A computer readable medium storing instructions that, when executed by a computer, cause the computer to perform a method of dynamically adjusting a margin of reserved capacity of a set of computing resources, the method comprising:
operating a set of resources having a dynamically adjustable membership;
selecting a response time increase factor representing a target maximum response time increase to be tolerated as the workload of the set of resources increases;
from graph data plotting response time increase factors against percentages of utilization of the set of resources, identifying a first utilization percentage corresponding to said selected response time increase factor;
setting the margin of capacity of the set of resources to be held in reserve to one hundred percent minus said first utilization percentage;
collecting response time data for a first workload comprising varying levels of loads on the set of resources;
from said collected response time data and said first workload, assembling adjusted graph data plotting response time increase factors against percentages of utilization of the set of resources;
from said adjusted graph data, identifying a second utilization percentage corresponding to said selected response time increase factor; and
adjusting said margin based on said second utilization percentage.

18. An apparatus for dynamically modifying a margin of reserved capacity of a set of resource, comprising:
a set of computing resources for which requests are received;
a first set of data plotting response time increase factors for varying percentages of utilization of the set of resources for randomly received requests;
a collection of observed response times for different load levels placed on the set of resources;
a second set of data plotting response time increase factors for varying percentages of utilization of the set of resources for randomly received requests, wherein said second set of data is derived from said collection of observed response times; and
a processor configured to:
analyze the first set of data to select an initial maximum usable percentage of the set of resources based on a specified acceptable response time increase factor; and
analyze the second set of data to dynamically select an adjusted maximum usable percentage of the set of resources based on the specified acceptable response time increase factor;
wherein an initial margin is set to one hundred percent minus said initial maximum usable percentage; and
a dynamically adjusted margin is set to one hundred percent minus said adjusted maximum usable percentage.

19. The apparatus of claim 18, further comprising:
a stored shape parameter configured to describe the second set of data.

20. The apparatus of claim 18, further comprising:
means for allocating an additional member to the set of resources.

* * * * *